Figure 1:
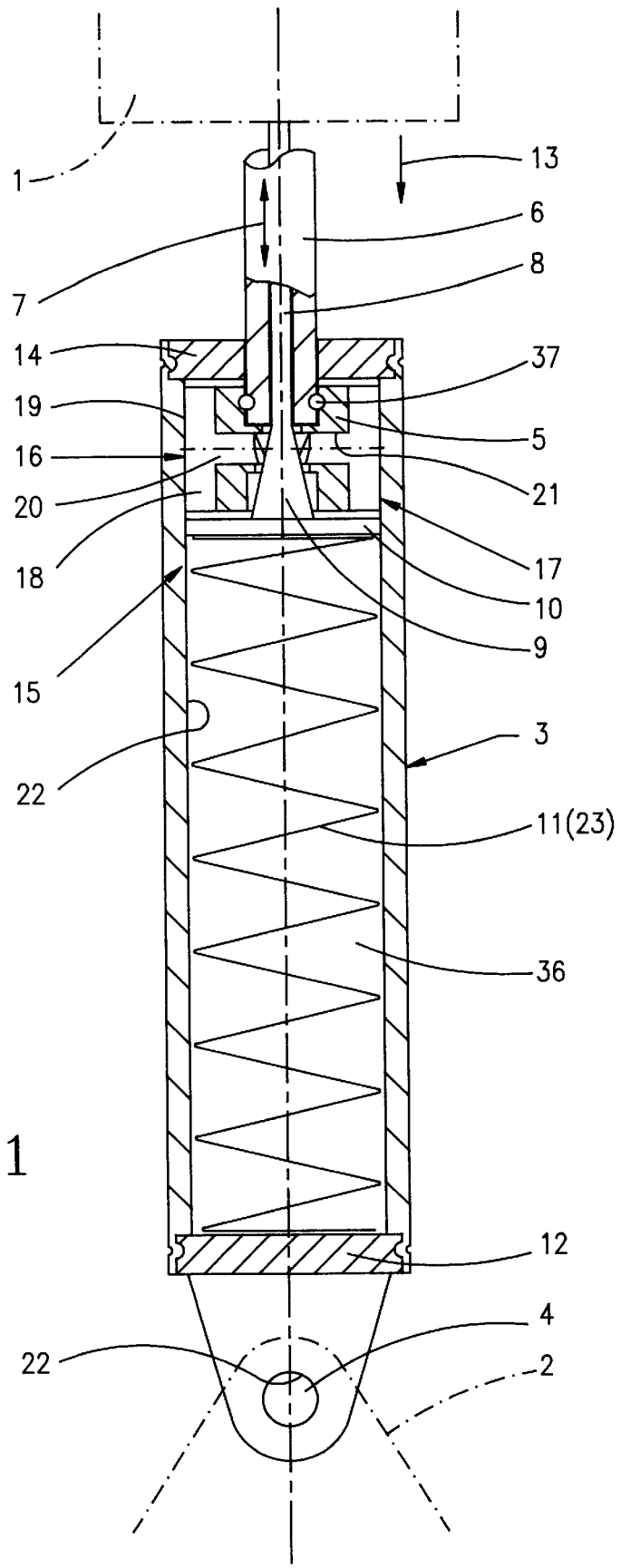

United States Patent
Hölle

[11] Patent Number: 5,921,359
[45] Date of Patent: Jul. 13, 1999

[54] PROGRESSIVELY BRAKED LOCKING DEVICE

[76] Inventor: Erwin Hölle, Schwarzwaldstrasse 11, D-72348 Rosenfeld, Germany

[21] Appl. No.: 08/776,193
[22] PCT Filed: Jul. 21, 1995
[86] PCT No.: PCT/EP95/02872
  § 371 Date: Jan. 27, 1999
  § 102(e) Date: Jan. 27, 1999
[87] PCT Pub. No.: WO96/03065
  PCT Pub. Date: Feb. 8, 1996

[30] Foreign Application Priority Data

Jul. 27, 1994 [DE] Germany .............................. 44 26 520
May 5, 1995 [DE] Germany ............................ 195 16 633

[51] Int. Cl.$^6$ ...................................................... F16F 9/32
[52] U.S. Cl. ........................... 188/300; 188/271; 248/161
[58] Field of Search ................................. 188/300, 319.2, 188/322.19, 271; 248/406.1, 161

[56] References Cited

U.S. PATENT DOCUMENTS

| | | | |
|---|---|---|---|
| 3,893,550 | 7/1975 | San Pablo De La Rosa | 188/322.19 |
| 3,983,965 | 10/1976 | Wright, Jr. | 248/54 R |
| 4,728,072 | 3/1988 | Mitchell | 248/406.1 |
| 4,817,898 | 4/1989 | Locher | 188/300 X |

*Primary Examiner*—Lee W. Young
*Attorney, Agent, or Firm*—Jones, Tullar & Cooper, P.C.

[57] ABSTRACT

The subject of the invention is an arresting device for fixing the selected relative position of an adjustable first element with respect to a second element, for example a seat of a piece of seating furniture, with respect to a base of a piece of seating furniture, with a cylinder fastened on a second element, in which a distancing element, which is connected with the first element, can be displaced in the displacement direction against the resistance of at least one restoring spring or vice versa, wherein the displacement movement can be blocked in each position and can be released by means of an actuating device, and with a mechanical brake having at least one adjustable brake element, by means of which the actuation element can be brought into a release position or can be released against the resistance of at least one brake spring. The creation of an arresting device which only has a few individual parts, is easy to assemble and provides sufficient space for receiving a satisfactory pressure spring is achieved in that the distance element is embodied as a piston rod, through which the actuation element passes axially toward the exterior, and that the piston rod is in operative connection with a piston, which can be arrested by means of the mechanical brake.

9 Claims, 6 Drawing Sheets

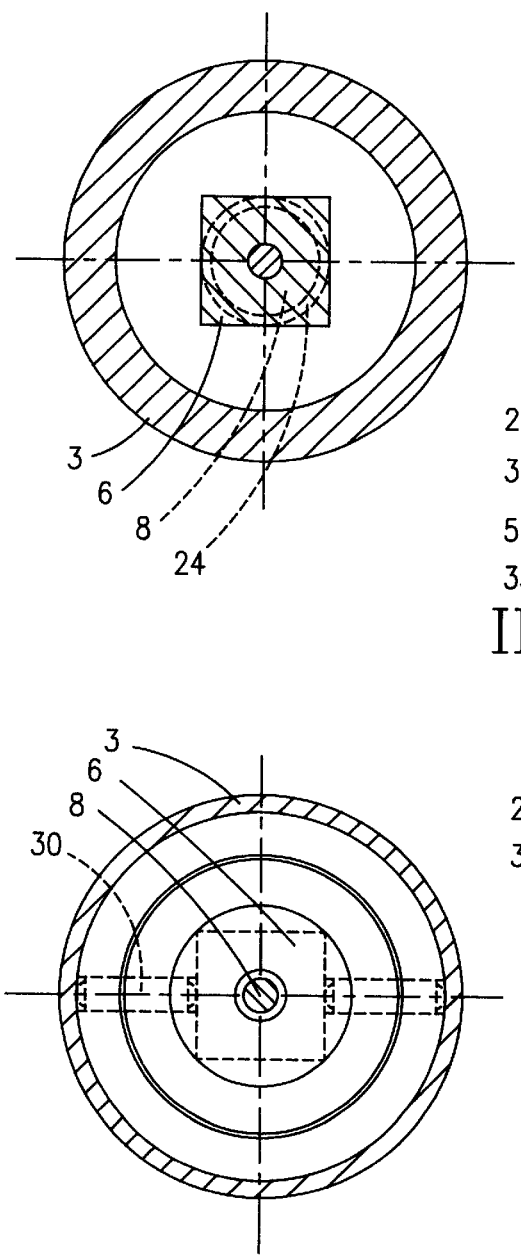
FIG. 4
FIG. 3
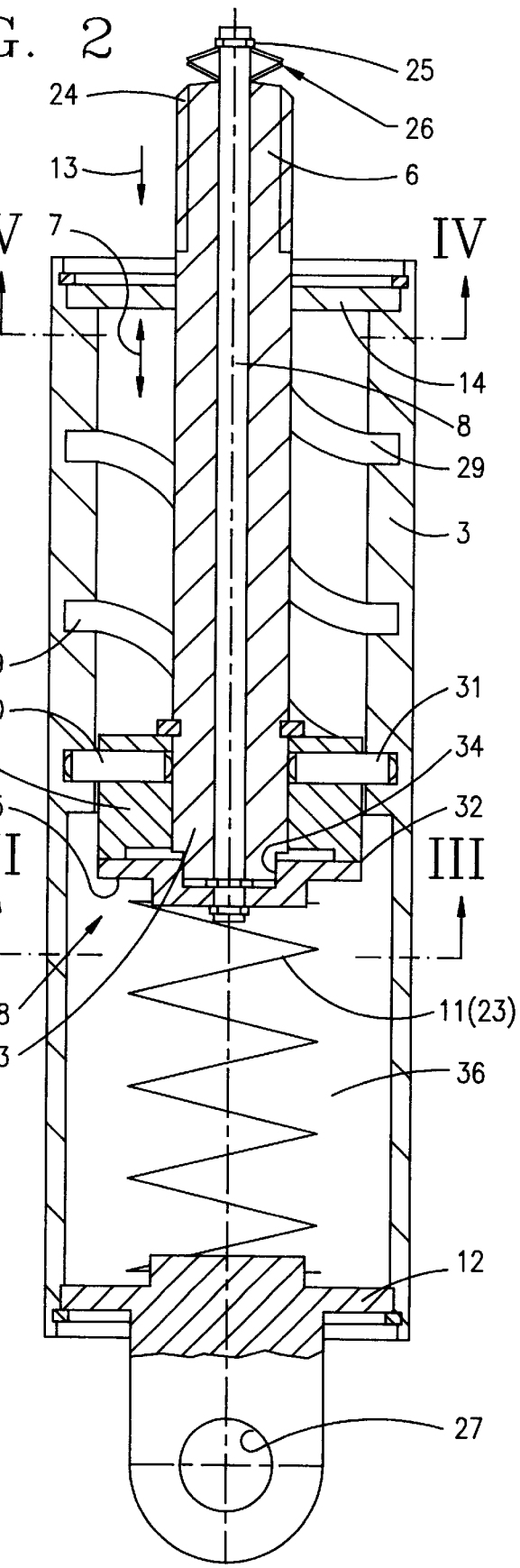
FIG. 2

PROGRESSIVELY BRAKED LOCKING DEVICE

FIELD OF THE INVENTION

The present invention relates to an arresting device for fixing the selected relative position of an adjustable first element with respect to a second element, for example the seat of a piece of seating furniture with respect to the base of the piece of seating furniture, with a cylinder fastened to the second element, in which a spacing element connected with the first element can be displaced in the displacement direction against the resistance of at least one restoring spring or vice versa, wherein the displacement movement can be blocked in any displaced position and can be released by means of an actuating element, and with a mechanical brake having at least one adjustable brake element, by means of which the actuation element can be brought into a release position or can be released against the resistance of at least one brake spring.

BACKGROUND OF THE INVENTION

One field of application for such an arresting device is the piece of seating furniture cited as an example. It is used there, for example, for bringing the seating height into a suitable position for the respective user of this piece of seating furniture, which is retained until the next adjustment. Pieces of seating furniture, for example office chairs, are possibly also equipped with further arresting devices of this type, especially in deluxe models, for example an adjusting device for the inclination of the arms and/or the inclination of the seat surface.

Such arresting devices furthermore are also employed in automobile manufacturing, for example to maintain hatches in the open position. Other fields of application are door openers, washing machines and the like.

Up to now, such arresting devices were known in connection with so-called gas pressure springs. In this case the cylinder is filled with a gas, which can flow from the chamber in front of the piston into a chamber behind the piston and vice versa, via a valve which can be actuated from the outside. In most cases a small amount of a fluid, for example oil, is also contained in these arresting devices.

The particular disadvantage of these known arresting devices lies in their problematic capability for recycling, which is mainly a result of the liquid filling. Aside from this, they are comparatively expensive and not without danger because of the valve arrangement. An abrupt displacement into one of the two end positions has sometimes occurred when the valve malfunctioned, which at least greatly scares the user and can possibly injure him. Furthermore, unavoidable gas losses bring constant doubts whether elements which are stored or have been installed are still capable of functioning. Repairs are impossible with gas springs.

A device for adjusting the stroke of elements, in particular of office swivel chairs, is known from German Published application OS 33 46 225, wherein two hollow cylinders can be inserted into each other in the manner of a telescope. A threaded rod, which is supported on the outer cylinder, is seated axially displaceable in the inner cylinder and a rotatably seated threaded sleeve connected with the inner cylinder is in engagement therewith. The two cylinders are pushed apart by a helical compression spring attached to the interior as soon as a brake arranged above the threaded sleeve is released.

The brake comprises a conically embodied brake drum and a brake spring, which force-lockingly maintains the brake drum in a correspondingly embodied section of the inner cylinder. The brake drum can be axially displaced by an actuating element which can be operated from the outside and can thus release the threaded sleeve. If now no further axial forces are introduced into the device, the helical compression spring can push the threaded sleeve upward along the threaded flank and rotate it in the process, since the thread is an easily moving trapezoidal thread.

In order to move the threaded sleeve, i.e. the seat surface of the chair, downward, it is necessary to overcome the spring force. This is customarily achieved by sitting in the chair.

Such devices are often employed in connection with heavy office chairs, tail gates of automobiles and the like, where only a limited amount of space is available. Thus the designer of such devices is faced with the difficulty of providing sufficient space for a helical compression spring of sufficient size which, on the one hand, is capable of actually pushing up the load when the brake is released and, on the other hand, can be housed in the available space.

Further than that, the device in accordance with German published application OS 33 46 225 consists of a large number of interlaced individual parts, which make its production and assembly difficult and expensive. It is not possible to absorb large longitudinal forces, since otherwise the brake cone angle becomes too shallow and can only be released with difficulty or not at all.

German published application 36 00 399 A1 discloses a spring element of the type mentioned above. This spring element has the disadvantage that the braking effect is generated by the contact of the braking elements on the interior circumference of the cylinder. A deformation of the cylinder is not unlikely with strong braking forces.

SUMMARY OF THE INVENTION

Based upon this, it is an object of the present invention to provide an arresting device which has only a few individual parts, is simple to mount, can absorb large forces and provides sufficient space for receiving an adequate compression spring.

This object is achieved by an arresting device of the type mentioned at the outset in such a way that the spacing element is embodied as a piston rod, through which the actuating element extends axially toward the exterior, and that the piston rod is in operative contact with a piston which can be arrested by means of a mechanical brake.

An arresting device embodied in accordance with this technical teaching has the advantage that some components can be eliminated because of the arrangement of a piston rod and a piston connected therewith, on which the brake acts directly. For example, among other things the piston rod assumes the function of a spacing element, which is performed by the inner cylinder of German Laid Open Application 33 46 225, so that with the arresting device in accordance with the present invention the inner cylinder can be eliminated.

Because of this not only is a cost-intensive component eliminated, but simultaneously the diameter available to the helical compression spring is increased while the dimension stays the same, so that a helical compression spring of a higher force can be employed.

Furthermore, the arrangement of the actuating element in the piston rod contributes to a compact construction of the arresting device in accordance with the invention.

More components can be eliminated because of the direct action of the brake on the piston, and the structure of the arresting device can be further simplified.

No cross flow of a medium from one cylinder chamber into the other takes place with this arresting device, aside from the air displacement by the movable piston which, however, does not create a usable effect. Instead, the piston movement is mechanically stopped once the set position has been reached. If the latter is to be changed, the arresting of the piston is released, it is displaced into the next position of use and again arrested. All this takes place, the same as in known arresting devices, by an axial displacement of the actuating element which extends through the piston rod in the axial direction toward the exterior, which as a rule is performed manually. If the brake is released, this automatically results in a relaxation or stronger compression of the brake spring. This stored force acts when the actuation element is released. This then leads to locking of the brake and thus to arrestment in the set position, for example of the seat of a chair in relation to the base.

Since with this arresting device it is possible to eliminate expensive seals, and the number of individual parts is not or at least not considerably greater than with known arresting devices, production costs can also be lowered considerably. The exterior dimensions can also be the same as with conventional arresting devices. Furthermore, continuous adjustment is easily possible, as well as the application of a blocking force of the same order of magnitude as with the known prior art. Releasing and setting takes place in the identical manner, so to speak, unless special functions are desired. Thus, the arresting device in accordance with the present invention represents a fully adequate replacement for devices with gas springs and has the same dimensions. No higher noise output is to be expected than with the prior art.

In accordance with the present invention, braking takes place between the piston and the actuating element. Furthermore, in accordance with the present invention the piston does not perform a purely axial movement in the cylinder and instead is screwed together with the cylinder. If the component of rotation of the piston is stopped with the aid of the brake, an end to the axial movement is also achieved in this way and therefore a fixing of the arresting device. This presupposes, of course, that the brake counter-face must be fixed against relative rotation with respect to the actuating element.

The arrangement of the actuating element in the piston rod further contributes to a compact construction of the arresting device in accordance with the present invention.

More components can be eliminated because of the direct action of the brake on the piston, and the structure of the arresting device can be further simplified.

No cross flow of a medium from one cylinder chamber into the other takes place with this arresting device, aside from the air displacement by the movable piston which, however, does not create a usable effect. Instead, the piston movement is mechanically stopped once the set position has been reached. Of the latter is to be changed, the arresting of the piston is released, it is displaced into the next position of use and again arrested. All this takes place, the same as in known arresting devices, by an axial displacement of the actuating element which extends through the piston rod in the axial direction toward the exterior, which as a rule is performed manually. If the brake is released, this automatically results in a relaxation or stronger compression of the brake spring. This stored force acts when the actuation element is released. This then leads to locking of the brake and thus to arrestment in the set position, for example of the seat of a chair in relation to the base.

Since with this arresting device it is possible to eliminate expensive seals, and the number of individual parts is not or at least not considerably greater than with known arresting devices, production costs can also be lowered considerably. The exterior dimensions can also be the same as with conventional arresting devices. Furthermore, continuous adjustment is easily possible, as well as the application of a blocking force of the same order of magnitude as with the known prior art. Releasing and setting takes place in the identical manner, so to speak, unless special functions are desired. Thus, the arresting device in accordance with the present invention represents a fully adequate replacement for devices with gas springs and has the same dimensions. No higher noise output is to be expected than with the prior art.

A preferred embodiment of the present invention is characterized in that the mechanical brake is located between the piston and the cylinder. Here the interior piston wall constitutes a brake counter-surface over the entire displacement area and is possible to design its surface in accordance with the desired braking effect.

In this case a further development of the present invention provides that at least one brake element is situated on the piston, which is movable transversely to the longitudinal axis of the latter and is pressed against the interior piston wall in its effective position. The braking force is the result of the at least one brake spring mentioned. A, for example, the brake element is pulled back in the radial direction in relation to the cylinder diameter until it is lifted off the interior cylinder wall, it is subsequently possible to displace the piston easily inside the cylinder, for which purpose the force of the restoring spring or, with a chair, the weight of the user when the seating surface is lowered can be employed. This is correspondingly true for the other mentioned or unmentioned cases of application.

A further embodiment of this arresting device is characterized in that each brake element consists of a brake shoe with a circular-cylindrically domed brake surface, and a bearing pin located on its brake, which is displaceably seated in a radial piston bore and against whose inner-end an actuating cone is placed, which is located on the inner end of the actuating element, wherein the cone end of smaller diameter is connected with the actuating element, and that the restoring spring for the piston or the piston rod preferably forms the brake spring at the same time and rests with one end on the cylinder bottom and with the other end on the actuator cone. By means of this the brake can be released in the simplest manner through an axial movement of the actuating element, or it can be locked through an oppositely directed displacement movement. The principle of an inclined plane is used here, wherein the required force can be set over a wide range by the appropriate choice of the inclined plane. The maximum displacement path of the actuating element is of course also closely related to this. In this connection it should not be overlooked that in many cases no direct effect is exerted on the actuating element, instead indirectly through at least one further element, for example a two-armed lever.

If in a very advantageous manner the end of the cone which has a larger diameter makes a transition into a flat plate, guided in the cylinder, or is connected therewith, this plate can constitute a spring plate in which the associated spring end can be centered, if necessary. In any case, however, the spring end in question pushes directly against this cylinder. With the customary play, the exterior diameter can correspond to the interior diameter of the cylinder, so that a correspondingly large spring can be used.

A further development of the invention is characterized in that the piston is seated rotatably, but axially non-displaceably, on the piston rod, wherein the piston performs a controlled rotating movement when displaced in the cylinder. The axial movement of the piston is superimposed on this rotating movement, and in this way it is possible to freely select the association between the rotating movement and the stroke over a wide range. It is possible by means of this arrangement to reduce the blocking force required for a defined axial load.

Another variant of the invention ensues from claim 7. Here, too, the piston does not make a purely axial movement in the cylinder, instead, it is screwed into the cylinder. If the rotational component of the piston is prevented with the aid of the brake, the end of the axial movement and thus the locking of the arresting device is also achieved in this way. This of course requires that the brake counter-surface must be fixed against relative rotation in respect to the actuating element.

This is achieved in a further embodiment of the invention in accordance with claim 8. The brake disk mentioned there can be lifted off the piston by means of the actuating element or can be placed against it. The required axial displaceability is achieved by means of the non-rotatable, displaceable seating of the brake disk on the piston rod end. As soon as the brake disk is axially adapted to the piston by means of the brake spring or springs, it cannot rotate any longer on the piston rod and therefore can no longer be screwed down in the cylinder. The fixation of the arresting device in the selected set position is therefore assured.

The brake disk suitably forms a spring plate for the associated end of the restoring spring of the piston and for the piston rod at the same time. In accordance with the exemplary embodiment it is then also easily possible to center the spring on it. This is important in particular when the spring diameter is less than the interior cylinder diameter.

A particularly preferred embodiment of the invention is characterized in that at least one helically shaped guide groove for one or each one of the radial guide pins of the piston engaging it is situated in the interior cylinder wall. The guide pin takes on the function of a sliding block. The guide groove furthermore must be open at least on one end in order to be able to "thread" the guide pin or pins. If the guide pin or pins are retractable, this step is of course not necessary, however, it can still be practical.

In further development it is provided that an at least double-threaded guide groove of the cylinder with preferably a rectangular or trapezoidal cross section is provided. If large axial loads on the piston rod are expected, something which must also readily be counted on because of a lever transmission with a chair or a chair arm arresting device, it is easily possible to take this into account by means of an appropriate profiled design of the guide groove, by an appropriate angle of inclination of the groove and, if required, by a single-threaded instead of a multi-threaded groove.

In a further preferred embodiment the piston rod is rotatably seated in respect to the piston, and the piston has threaded flanks on its exterior surface which engage corresponding guide grooves in the threaded sleeve and maintain the piston axially in this way. By means of this the piston can be axially displaced by rotating around its longitudinal axis corresponding to the pitch of the thread.

This has the advantage that the piston has some support in the axial direction and that a first braking effect is achieved by the friction between the thread flank and the guide groove. In this case the pitch of the thread should preferably be selected such that even under a slight pressure a rotation of the piston takes place. For applications of this type a smooth-running trapezoidal thread is particularly well suited.

In a further development the adjustable brake element is embodied as a conically designed brake cone, which is situated in a receiving area of the piston which is correspondingly complementary designed. The brake cone is pressed into this receiving area, for example by a spring force, in such a way that a frictionally connected coupling is created. To this end it is advantageous if the brake cone is seated coaxially on the piston rod.

The conical design permits a simple insertion of the brake element into the receiving area without tilting and assures that the largest possible contact surface is available for the desired frictional connection. Furthermore, a simple construction is provided in this way which requires only a few components which are easy to mount, and which arrests the piston effectively.

In a first further development the piston is slit in the manner of a collet chuck in its receiving area and, if desired, beyond it. Because of this the brake cone can be more strongly wedged together with the piston and in this way develops an even stronger frictional connection. The piston is additionally also wedged in the guide groove of the cylinder.

In this embodiment the brake spring element is composed of several, preferably five plate springs disposed in series.

In order to be able to axially displace the brake cone, a transverse bolt is provided on the actuating element, which axially displaces the brake cone against the force of the brake springs and thus cancels the frictional connection as soon as the actuating element is operated. In this case the transverse bolt can be attached fixedly or releasably to the actuating element.

In another preferred embodiment the mechanical brake contains a pre-load braking device which has the adjustable brake element, and a main brake device. By means of dividing the brake into two partial brakes it is possible to make the individual partial brakes of smaller size, so that the arresting device as a whole can be constructed even more compactly. The free space gained in this way can be used, for example, for a larger and more efficient helical pressure spring.

In a first further development of this embodiment, preferably two, three or four radially extending pin-like main brake cams are attached to the piston rod, approximately at the height of the center of the piston. Preferably these main brake cams are made of one piece with the piston rod and are supported in both axial directions on the piston via main brake springs, which are preferably composed of several plate springs arranged in series. In this case an axial roller bearing is disposed between the plate springs of each main brake spring.

These main brake cams located on the inside are connected, fixed against relative rotation, with the piston rod and rest on a brake protrusion as soon as the force acting on the piston rod is greater than the preset prestress of the main brake spring.

In this embodiment the pre-load brake device, i.e. the brake cone, is disposed directly on the restoring spring, which simultaneously assumes the function of the brake spring element. Only a comparatively small brake moment is generated by this pre-load brake device, because the main brake device takes on the main brake work, so that the spring force of the restoring spring can be mainly used as a restoring force and only a small portion needs to be used as the brake force.

As compensation the pre-load brake device can have a small size and takes up only little space, so that the remaining space can be used for the restoring spring.

By means of a small pre-load brake device it is simultaneously achieved that the forces for operating the actuating element are small, so that a user-friendly arresting device is created.

In a second further development of this embodiment, catches are attached to the piston rod, which project through the cylinder and rest against the restoring spring disposed outside of the cylinder. In this case the catches are preferably guided with pass fit in a slit in the cylinder wall. In an advantageous manner the catches are directly attached to the main brake cam.

This has the advantage that the restoring spring can be laid around the cylinder and in this way can clearly have larger dimensions, and that the piston rod is held, secure against relative rotation, in the piston by the main brake cams and the catches.

A main concept is the basis for these two forms of further development. In the case of stroke displacement, the rotatably seated piston (rotor) is guided and seated by rolling friction, here preferably by means of an axial roller bearing, because of which even a slight drive torque on the basis of a longitudinal force is sufficient for actuation. In case of braking, a sliding friction which then starts, is superimposed on the rolling friction and increases steadily with the longitudinal force or follows the piston rod load drop dynamically. This brake, which dynamically reacts to the load drop, can also be realized by means of rolling or sliding piston rotor flank elements.

Further embodiments of these arresting devices, as well as types of effects and advantages resulting therefrom ensue from the description of exemplary embodiments.

Figure 5:
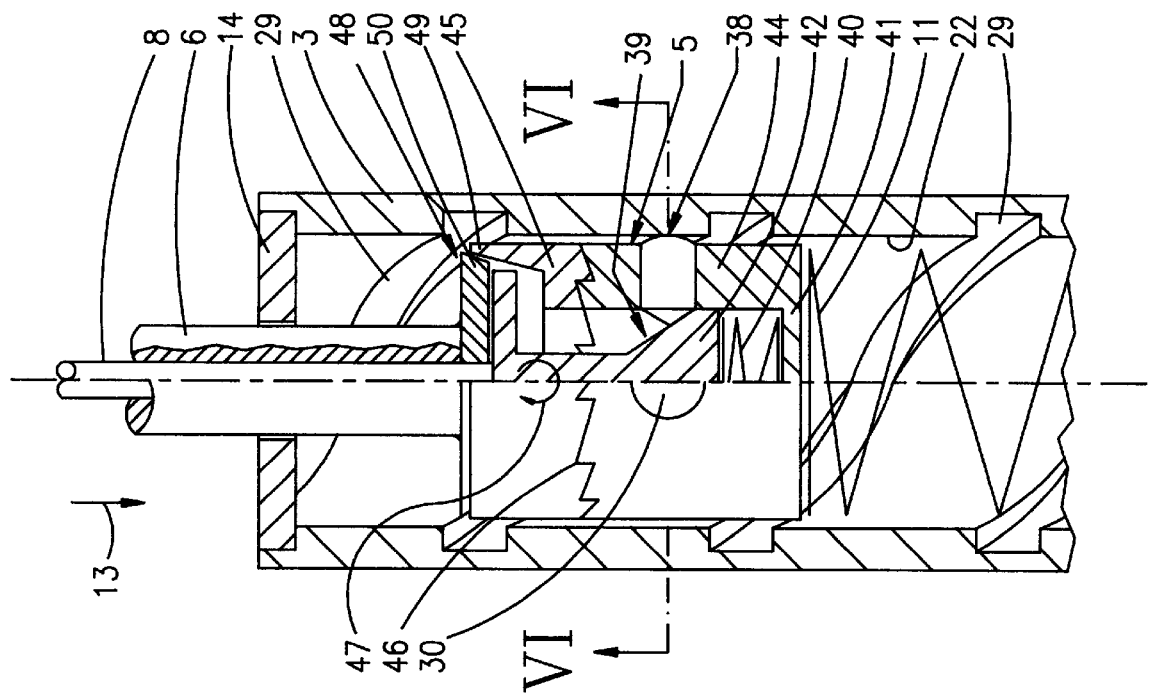
Figure 6:
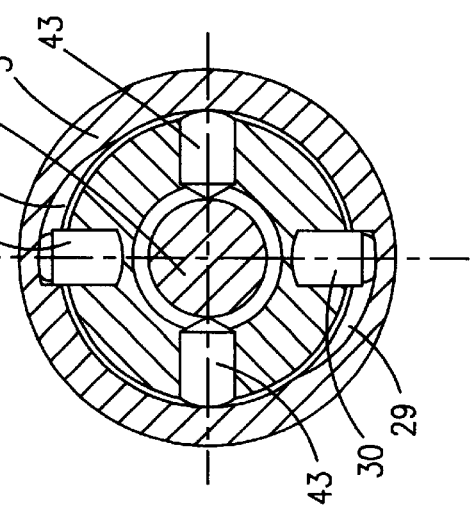
Figure 7:
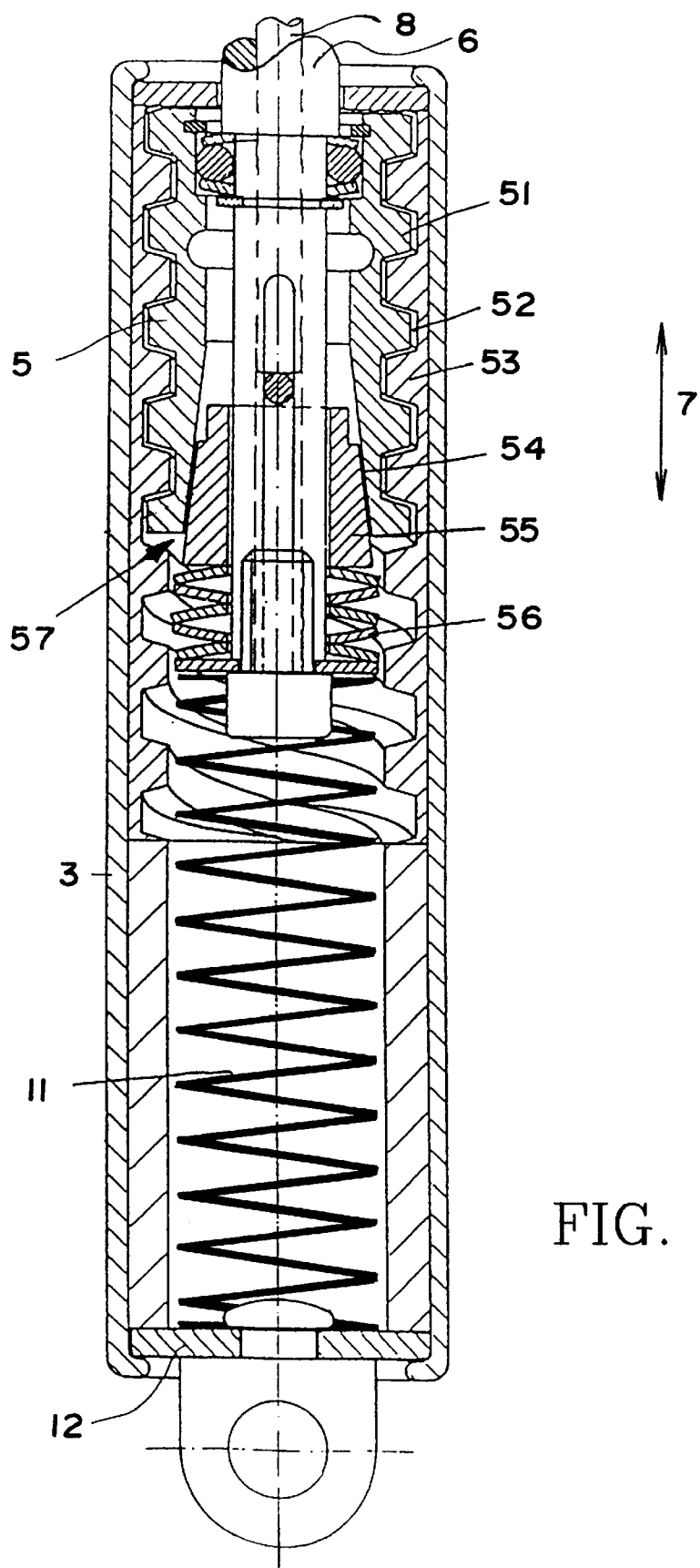
Figure 8:
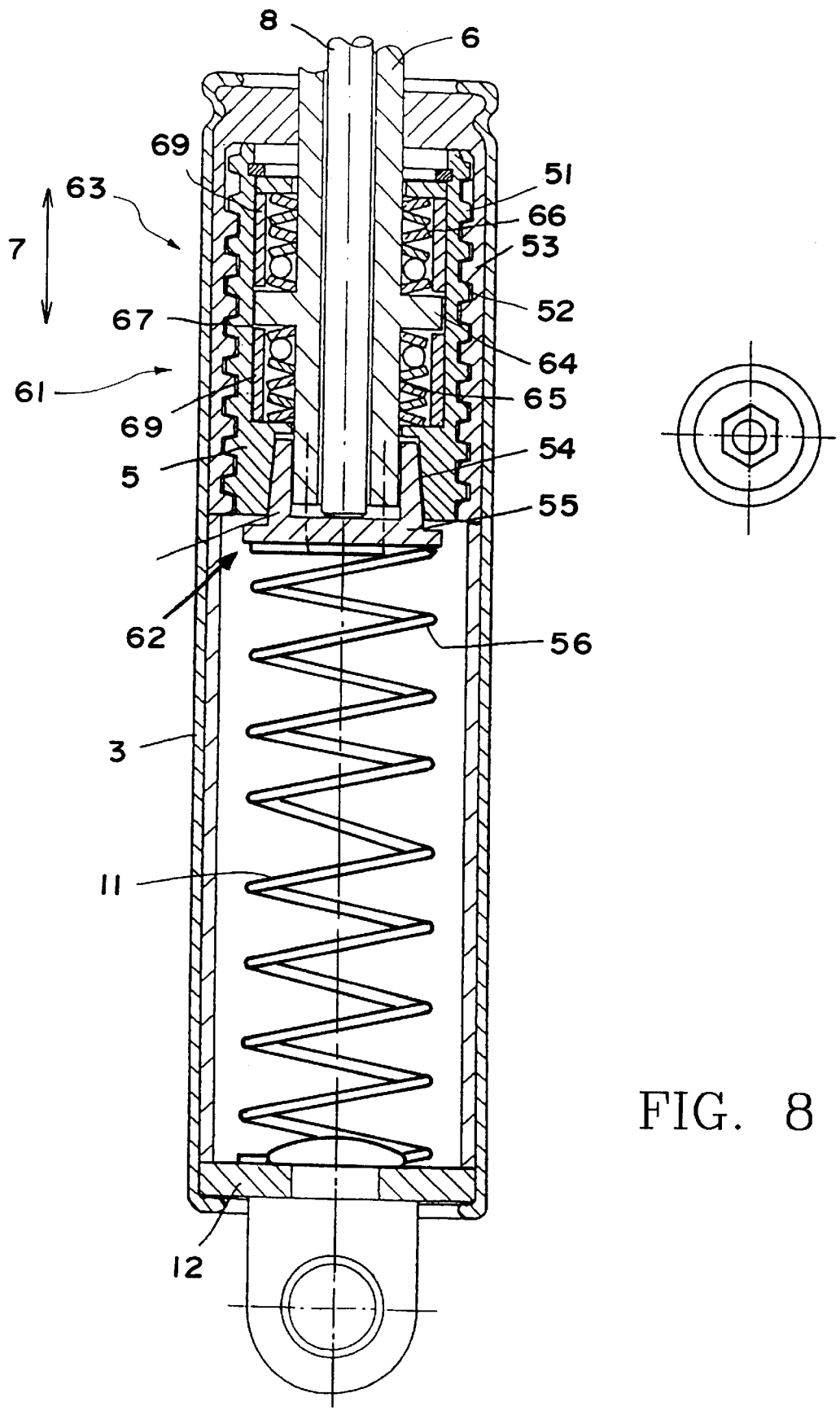
Figure 9:
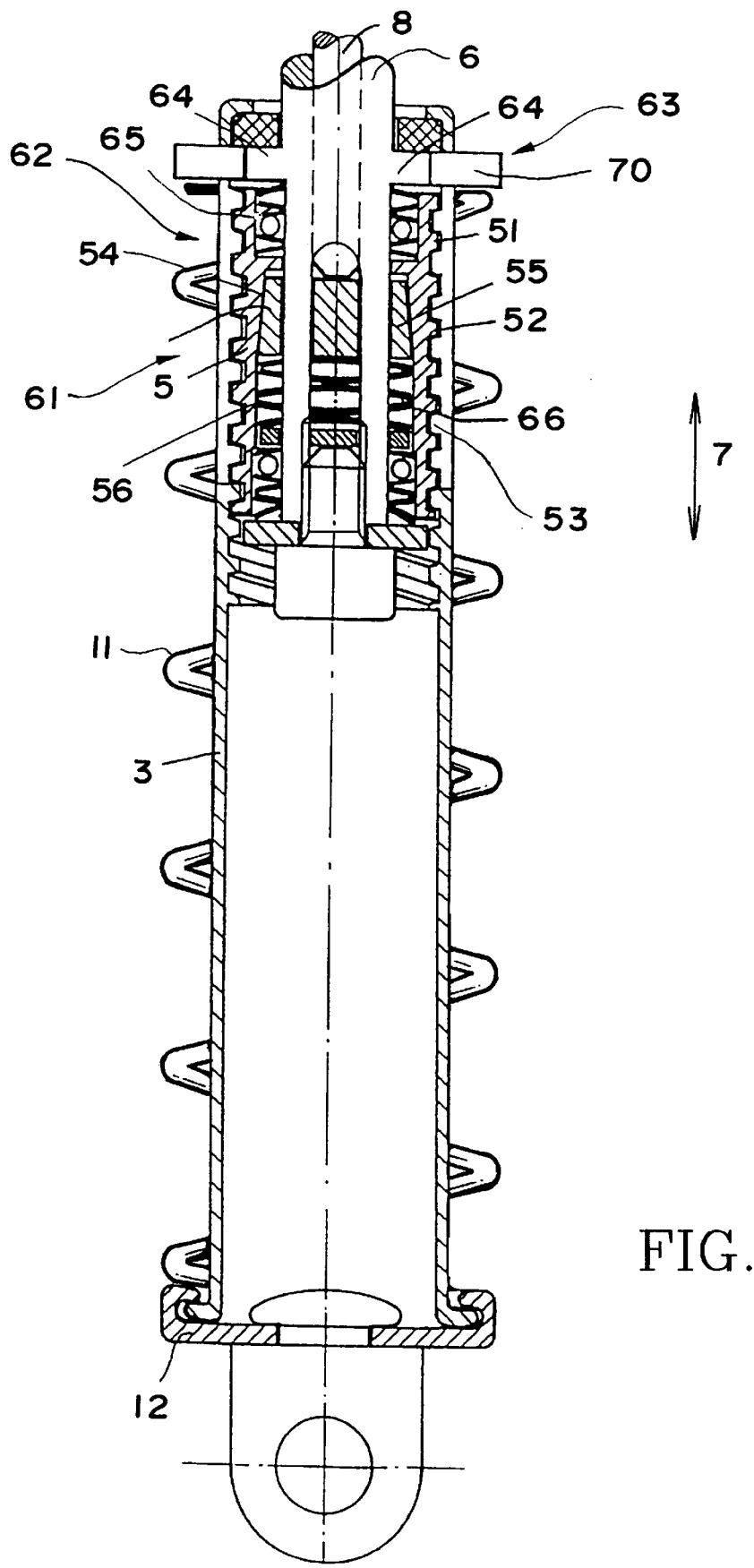

These exemplary embodiments of the invention are represented in the drawings. Shown here are in:

FIG. 1, a broken longitudinal section through a first embodiment;

FIG. 2, an also broken longitudinal section through the second variant of the invention;

FIG. 3, a section in accordance with the line III—III of FIG. 2;

FIG. 4, a section along the line IV—IV in FIG. 2;

FIG. 5, a third exemplary embodiment of the invention in broken longitudinal section;

FIG. 6, a section along the line VI—VI in FIG. 5;

FIG. 7, a fourth exemplary embodiment of the invention in broken longitudinal section;

FIG. 8, a fifth exemplary embodiment of the invention in broken longitudinal section;

FIG. 9, a sixth exemplary embodiment of the invention in broken longitudinal section.

The arresting device is used for fixing a selected changeable relative position of a first element 1 in respect to a second element 2, for example the seat of a piece of seating furniture in respect to the base of the piece of seating furniture. In this application the height position of the seating surface in respect to the floor on which the frame stands is adjusted to the body size of the user of this piece of seating furniture, and is arrested following adjustment. Other areas of use have been recited above, wherein this recitation is of course not exhaustive.

For example, a cylinder 3 of the arresting device is fastened on the second element 2, for example, it is pivotably seated by means of a pin 4. A piston 5 with a piston rod 6 can be displaced back and fourth in the direction of the two-headed arrow 7 in the cylinder 3. The piston rod therefore is tube-shaped and a rod-like actuation element 8 can be displaced in its interior. In FIG. 1, it has an actuating cone 9 on its inner end, wherein its end with the smaller diameter is connected or even made in one piece with the associated end of the actuation element 8. The end of the actuation cone 9 of larger diameter makes a transition into a flat plate 10, which can also be formed in one piece on it, if desired. In the exemplary embodiment, its diameter, along with the usual play, is approximately of the same size as the interior diameter of the cylinder 3. The end of a restoring spring 11 is supported on this plate 10. Its other end, the lower one in FIG. 1, rests on the cylinder bottom 12 or is pressed against it when the spring is prestressed. Therefore if the piston rod 6 is not under a load in the direction of the arrow 13, or if this load is small, the piston 5 in FIG. 1 takes up an end position in which it is located in front of the other cylinder bottom 14, through which the piston rod 6 extends from the exterior.

In accordance with the invention, the arresting device is equipped with a mechanical brake 15. This has at least one adjustable brake element. Two such brake elements 16, 17 are provided in the exemplary embodiment of FIG. 1. In the particular case these are respectively a brake shoe 18 with a circular-cylindrically domed brake surface 19, which has a bearing pin 20 on the back. By means of the latter it can be displaced in the radial direction in a radial bore 21 of the piston 5. The inner ends of the bearing pins are respectively crowned in accordance with FIG. 1. The end of the actuation cone 9 of the smaller diameter reaches between the crowned ends of all bearing pins or brake shoes 18. It can be easily seen that by displacing the actuating element 8 counter to the arrow 13 the bearing pins 20 can be outwardly displaced and because of this the brake shoes 18 are pressed against the inner wall 22 of the cylinder 3. This leads in the desired manner to a braking effect which is of sufficient size so that each load placed in the direction of the arrow 13 on the piston rod 6 can be absorbed with the aid of this mechanical brake 15.

The loading force counter to the arrow 13 is a spring force. In case no additional springs are present or provided, the restoring spring 11 simultaneously takes on the function of a brake spring 23. But, as illustrated in the exemplary embodiment of FIG. 2, it is also possible to insert one or several brake springs 26, for example a plate spring package, between the free end of the piston rod 6 which, for example, can also be provided with a male screw thread 24 and a collar or support ring 25 on the actuating element 8. The brake springs exert a continuous force on the actuating element 8, which acts counter to the arrow 13.

If in FIG. 1 the mechanical brake 15 is released by a slight action on the actuating element 8 in the direction of the arrow 13, it is possible by a corresponding action on the piston rod 6 to displace the latter upward or downward, together with the piston 5 and the mechanical brake 15. The displacement move starts without jerking and is comparable with the movement of a gas pressure spring. In a manner not shown it is possible to choose a smaller diameter for the plate 10 and to let only the brake spring 23 act on it. The latter is then located concentrically inside a loading spring 11, which passes by the plate 10 and is then supported on the lower end of the piston 5. In this case the brake shoes must be slightly smaller toward the bottom, so that the load spring can only act on the piston 5 and not also on the brake shoes.

Two springs placed one behind the other are also conceivable, wherein the brake spring is located in a box on the underside of a brake disk 32 of the second exemplary embodiment.

The first element 1 and the second element 2 are not represented in the exemplary embodiment of FIG. 2. However, the lower bearing bracket of the cylinder 3 with the bore 27 for receiving the pin 4 of FIG. 1 can also be seen there.

While in the first exemplary embodiment (FIG. 1) the mechanical brake 15 is inserted between the piston 5 and the cylinder 3, a mechanical brake 28 is provided with the second variant (FIG. 2), which is inserted between the piston 5 and the actuating element 8. To this end it is necessary for the piston 5 to be seated rotatingly on the piston rod 6 and for it to perform a controlled rotating movement in the cylinder 3. In other words, displacement of the piston 5 in the cylinder 3 in the direction of the two-headed arrow 7 is only possible via a superimposed rotating movement of the piston in the cylinder 3. For this purpose a guide groove 29 has been cut on the inside into the cylinder wall, which can well be multi-threaded, but also single-threaded. A double-threaded guide groove with a rectangular profile has been provided in the exemplary embodiment of FIG. 2. A guide pin 30 or 31, which radially projects past the piston, engages each one of these guide grooves. An axial displacement of the piston rod 6 in the direction of the arrow 13 or in the opposite direction therefore causes a rotation of the piston around the lower end of the piston rod 6, wherein the guide pins 30 and 31 pass through the associated section of the guide groove or grooves 29.

This rotating movement can be prevented with the aid of the mentioned brake disk 32, which is seated on the lower end (FIG. 2) of the piston rod 6 in an axially displaceable but non-rotatable manner. This lower free end of the piston rod 6 is provided with a polygon 33, for example a square. The brake disk 32 has a corresponding polygonal receiver 34 and additionally a through-bore for the lower end of the actuating element 8. The latter can be axially maintained on the lower end of the actuating element 8, for example with the aid of two locking rings disposed on both sides.

In the exemplary embodiment of FIG. 2, the brake disk 32 is pressed with the aid of the restoring spring 11, but also of the additional brake springs 26, against the underside of the piston 5 which, in the exemplary embodiment, has a ring-shaped brake counter-face 35. If the actuating element 8 is pressed down in the direction of the arrow 13, the brake disk 32 is slightly lifted off the brake counter-face 35, and the piston 5 can then be screwed in the cylinder 3 by acting on the piston rod in the direction of the arrow 13 or in the opposite direction, by means of which a different relative position of the first element 1 in respect to the second element 2 is achieved. As soon as the actuating element 8 is released, the mechanical brake 28 is re-engaged and the rotation of the piston 5 in the cylinder 3 is prevented.

In the manner described above it is possible in connection with this variant, too, to provide two concentric springs in the cylinder chamber 36, wherein the outer constitutes the load spring 11 for the piston, and the inner is the brake spring 23. The dimensions in the area of the mechanical brake 28 must be correspondingly changed.

In the exemplary embodiment of FIG. 1, it is absolutely clear that it is also possible for example to provide on the piston 5 two guide pins 30 and 31, offset by 180°, which are then arranged spaced apart between the two brake elements 16 and 17, which are also offset by 180°. It is possible there, too, to provide the cylinder 3 with a single- or multi-thread guide groove 29 on the inside. With this variant it is then of course also necessary that the piston 5 be rotatably seated on the piston rod 6. This can be achieved, for example in the schematically indicated manner, with the aid of a snap ring 37 with a circular cross section or in another known manner.

If a controlled rotating movement is superimposed on the lifting movement of the piston in the cylinder 3 in the above described manner, this leads, as a function of the pitch, to a more or less great reduction of the required braking force when arresting the first element 1 in respect to the second element 2 or vice versa. Because of this forced guidance of the piston 5, the load force brought to bear on the piston rod 6, or a load force brought to bear on the cylinder 3, is converted into a smaller force along the groove or grooves as a function of the groove pitch, so that the braking force of the mechanical brake 15, 28 only needs to take up this reduced force. Because of this, a smaller brake or load spring is sufficient.

It can be seen from FIGS. 2 to 4 that it is possible to make the piston rod 6 from a square material, for example. A circular cross section can be provided in the area of the upper cylinder bottom 14 of the outer end, which is provided with the thread 24, and on the other side in the area of the piston 5. A shoulder for the upper piston end to rest against is automatically created by cutting the thread.

FIG. 5 shows a third embodiment of the invention. Here, too, a mechanical brake 38 is inserted between the piston 5 and the cylinder 3. It has a brake body 39 situated centered in the interior of the cup-shaped piston 5. It is loaded by means of a brake spring 40, i.e. it is pushed against the inner end of the actuating element 8. One end of the brake spring is supported on the bottom 41 of the piston 5, while the other end is pressed against the lower side of larger diameter of the conical pressure body 42 at the end of the brake body 39 which is at the bottom in FIG. 5.

In this exemplary embodiment two guide pins 30 and 31, offset by 180°, are attached to the piston 5, each of which engages respectively one guide groove 29 in the interior piston wall, wherein this is a double-thread guide groove in this case. It is therefore not possible to simply displace the piston in the axial direction of the cylinder. Instead, it must be screwed in the cylinder in agreement with the description of the exemplary embodiment in accordance with FIG. 2. Two brake pins 43, also offset by 180° in respect to each other, are provided on the piston 5, which are offset by 90° in respect to the two guide pins 30 and 31 and which, in contrast to the guide pins, are seated displaceably in the radial direction on the piston or the piston wall. In a preferred manner each one has a conical tip on the inside, while its outer end is preferably slightly crowned. In accordance with FIG. 6, all brake pins and all guide pins are in the same radial plane. But while the guide pins 30, 31 engage the guide grooves 29, the outer ends of the brake pins 43 rest against the inner cylinder wall 22 above the guide grooves in FIG. 5 because of the 90° offset. The brake pins 43 are pressed against the inner cylinder wall by the action of the brake spring 40, and the rotation of the piston 5 in the cylinder 3 is prevented by this.

If this mechanical brake is to be released, it is necessary to press the brake body 39 against the resistance of the brake spring 40 against the piston bottom 41 with the aid of the actuating element 8 by pushing down in the direction of the arrow 13. Because of this the radially outwardly directed force on the brake pins 43 is removed and as a result of this the piston 5 can turn in the cylinder 3 or can be screwed in respect to the cylinder. As soon as the actuating element is released, the force of the brake spring 40 again comes into play and the piston comes to a halt. In this way the second element 2 is then arrested in respect to the first element 1.

In this exemplary embodiment the piston 5 consists of two parts, namely the essentially cup-shaped first piston element 44 and the essentially ring-shaped second piston element 45. Both are coupled with each other via a cross-shaped saw-tooth interlock 46. In place of the saw-tooth interlock, a free-wheeling device or another pair of elements which are locked in one direction of rotation, would also be conceivable.

For example, if the piston rod is pushed down in the direction of the arrow 13 while the brake is released, which can be achieved by a large load on the seat of the piece of seating furniture, a conical outer collar 48 at the lower end of the piston rod 6 pushes against the conical inner surface of an upward projecting edge 49 of the second piston element 45, which encloses the outer collar 48 while resting against it, so that the outer collar 48 and the second piston element 45 are frictionally connected with each other. The load on the piston rod 6 in the direction of the arrow 13 is transferred via the saw-tooth interlock 46 to the first piston element 44 with the guide pins 30 and 31. These move downward along the guide grooves 29, which results in a rotation of the entire piston 45. Since the outer collar 48 of the piston rod 6 which, for example, in accordance with FIG. 5 can also be constituted by a welded-on plate, does not perform a rotating movement, the downward directed screw motion of the piston 5 causes a frictional resistance at the transition from the outer collar 48 to the edge 49, which has a braked rotary movement as a result, wherein the restoring spring 11, which is compressed in the process, of course also counters the downward movement.

If, however, the first element 1, for example the seat of a piece of seating furniture, is released, so that the force of the restoring spring can take effect, the piston 5 is again screwed upward. But the first piston element 44 can turn in relation to the second piston element 45 because of the saw-tooth interlock 46, wherein the second piston element 45 is held, fixed against relative rotation by the frictional connection mentioned, at the transition to the outer collar 48. At this place it is therefore not necessary to overcome the frictional resistance between the outer collar 48 and the edge 49. Because of this a more weakly designed restoring spring 11 is sufficient.

The exemplary embodiments represented in FIGS. 7 to 9 all have threaded flanks 51 formed on the pistons 5, which helically surround the outside of the pistons 5. The threaded flanks 51 engage correspondingly designed guide grooves 52 in the threaded sleeves 53 in the cylinder 3. The piston 5 is rotatably seated in the guide grooves 52, wherein the threaded flanks 51 and the guide grooves 52 are embodied as an easily moving trapezoidal thread, so that the piston 5 is already being rotated when a small axial force acts on it.

With these embodiments a conically tapering receiving area 54 for receiving an also conically embodied brake cone 55 is provided in the piston 5, wherein the receiving area 54 and the brake cone 55 are embodied complementary to each other. The brake cone 55 is held frictionally connected in the receiver 54 by means of a brake spring element 56 and in this way generates a braking moment for arresting the piston 5 of the cylinder 3.

The fourth embodiment of an arresting device in accordance with the invention represented in FIG. 7 has a mechanical brake 57, wherein the receiving area 54 has a piston 5 slit in the manner of a collet chuck, which receives the brake cone 55 by means of a frictional connection and wedges it in the guide grooves 52. The brake cone 55 is seated on the piston rod 5 via a brake spring element 56 consisting of five plate springs 58 connected in series.

With this embodiment the restoring spring 11 acts on the free end of the piston rod 6 and presses the brake cone 55 of the mechanical brake 57 against the conical receiving area 54. Because of this the receiving area 54, which is slit in the manner of a collet chuck, is pushed apart and is wedged in the guide groove 52. At the same time the brake cone 55 is maintained frictionally connected in the receiving area 54.

The axial forces acting in this way on the piston 5 generate a torque on the piston 5, which is braked via the mechanical brake 57, so that the piston 5 remains in its position.

By means of operating the actuating element 8, an axial force is introduced via a transverse bolt 59 attached to the actuating element 8 into the brake cone 55, which radially displaces it and cancels the frictional connection between the piston 5 and the brake cone 55. The piston 5 is now no longer braked and the axial forces introduced by the restoring spring 11 are converted into torque via the trapezoidal thread and cause the piston 5 to rotate. By means of this rotating movement the piston 5, and therefore also the piston rod 6 screwed to the piston 5, is screwed upward.

If now, for example because someone sits on the chair, an axial force, which is greater than the spring force of the restoring spring 11, is introduced via the piston rod 6 into the arresting device, the piston 5 is turned in the opposite direction and moves downward.

In this embodiment the piston rod 6 is seated on the piston 5 via a piston rod ball bearing 60. Here, the piston 5 can be turned in respect to the piston rod 6.

The embodiments represented in FIGS. 8 and 9 have mechanical brakes 61, which are comprised of a pre-load braking device 62 and a main load braking device 63.

The pre-load braking device 62 essentially corresponds to the mechanical brake 57 in accordance with FIG. 7, but clearly has smaller dimensions. In contrast to the mechanical brake 57 in accordance with FIG. 7, the pistons 5 in the pre-load braking device 62 are not slit and in the fifth embodiment in accordance with FIG. 8 the brake spring is omitted. Here the restoring spring 11 acting on the brake cone 55 takes on this function.

The main load braking device 63 comprises two main brake cams 64 attached transversely in respect to the longitudinal direction of the piston rod on the piston rod 6, two main brake springs 65 and 66 which support the piston rod 6 on the piston 5, and a brake protrusion 67, on which the main brake cams 64 can be placed.

The fifth embodiment of an arresting device in accordance with the invention, represented in FIG. 8, has a main load brake device 63, wherein the main brake cams 64 reside approximately in the center of the piston 5. The main brake springs 65 and 66 adjoin the main brake cams 64 on both sides. The main brake springs 65 and 66 are respectively formed of five plate springs 58 arranged in series, wherein an axial ball bearing 68 is integrated between the plate springs 68.

The main brake cams 64 extend into the vicinity of the piston 5 and come to rest on a brake protrusion 67 embodied as the main brake sleeve 69 when the force which acts axially on the piston rod 6 sufficiently compresses the plate springs 58 of the main brake spring 65.

With the sixth embodiment of an arresting device in accordance with the invention, represented in FIG. 9, the main brake cams 64 are disposed outside of the piston 5 and come into contact at a brake protrusion 67 embodied on the free end of the piston 5, if the force which acts axially on the piston rod 6 sufficiently compresses the plate springs 58 of the main brake spring 65. Because of this the main brake sleeves, which are used in the embodiment in accordance with FIG. 8, are obsolete.

Furthermore, in this embodiment radially extending catches 70 are attached on the main brake cams 64, which extend through a corresponding slit in the cylinder 3 and rest against a restoring spring 11 disposed outside of the cylinder 3.

The mechanical brakes of the fifth and sixth embodiment function as follows:

After a load has be introduced into the piston rod 6, for example because a person sits in the chair, the force generated in this way is passed on for the largest part via the plate springs 58 of the main brake spring 65 to the piston 5. This force, which acts in the axial direction on the piston 5, is converted with frictional losses into torque via the thread. The plate springs 58 are simultaneously compressed.

This torque acting on the piston 5 still is comparatively small, since a small load is already sufficient to compress the plate springs 58, and it can be sustained by the brake cone 55.

As soon as the plate springs 58 have been compressed over a defined, preset spring travel, the main brake cams 64 rest on the brake protrusion 67. In the embodiment in accordance with FIG. 8, this brake protrusion 67 is embodied as a single, insertable main brake sleeve 69. The friction which is now generated between the brake cam 67 and the main brake sleeve 69 increases the braking moment acting on the piston 5 and dependably arrests the piston 5.

This brake system operates in a self-reinforcing manner, since with an increasing load the friction between the main brake cam 64 and the main brake sleeve also increases, and therefore also the braking moment.

If a height adjustment of the device is desired, the actuating element 8 must be operated in the usual manner so that the brake cone 55 releases the piston 5. Now a comparatively small load or force is sufficient to rotate the piston 5, since the axial ball bearing 68 arranged in the main brake spring 65 keeps the friction between the piston rod 6 and the piston 5 small.

It is important for the invention that the rolling friction can be converted into a sliding friction, because of which the frictional resistance is increased. Also important for the invention is any combination of characteristics, regardless of whether the characteristics have been disclosed in the claims, the specification or the drawings.

I claim:

1. An arresting device for fixing the selected relative position of an adjustable first element with respect to a second element, comprising:

a cylinder having two ends with one end being fastened to the second element;

at least one restoring spring mounted with said cylinder;

a spacing element in the form of a piston rod extending from the other end of said cylinder;

an actuating element which passes through said spacing element, said actuating element being connected to the first element;

a piston connected to said spacing element, said spacing element and said piston being displaceable against said at least one restoring spring away from the first element; and a mechanical brake inserted between said piston and said actuating element, and acting in the axial direction of said spacing element for arresting the displacement of said piston, said mechanical brake having at least one adjustable brake element, wherein said actuating element is brought into a release position to release said brake element against the resistance of said at least one restoring spring so that said piston can be displaced within said cylinder.

2. The arresting device as defined in claim 1, wherein said mechanical brake is a friction brake, and wherein said cylinder is adapted so that said piston is screwed into said cylinder.

3. The arresting device as defied in claim 2, wherein said at least one adjustable brake element comprises a brake disk which is displaceably and non-rotatably guided at one end of said piston rod and on an inner end of said actuating element, wherein said brake disk defines a brake counter-face, and wherein said piston engages said counter-face and is displaceably and non-rotatably associated on said piston rod.

4. The arresting device as defied in claim 3, wherein said brake disk forms a spring plate for the associated end of said at least one restoring spring.

5. The arresting device as defied in claim 2, further comprising:

at least one radial guide pin associated with said piston, wherein the inner wall of said cylinder includes at least one helically shaped guide groove for guiding said at least one radial guide pin, and thereby said piston.

6. The arresting device as defied in claim 5, wherein said at least one helically-shaped guide groove comprises an at least double-threaded guide groove, having at least one of a rectangular and trapezoidal cross section.

7. The arresting device as defined in claim 1, further comprising:

a brake spring situated between the outer end of said actuating element and the outer end of said piston rod.

8. The arresting device as defined in claim 7, wherein said brake spring comprises a plate spring.

9. The arresting device as defined in claim 1, wherein said piston rod is seated in said piston to be rotatable relative thereto.

* * * * *